United States Patent
Matsuyama et al.

(10) Patent No.: US 10,906,126 B2
(45) Date of Patent: Feb. 2, 2021

(54) METHOD FOR PRODUCING METAL MEMBER

(71) Applicant: KOMATSU LTD., Tokyo (JP)

(72) Inventors: Toshikazu Matsuyama, Hirakata (JP); Masaharu Amano, Hirakata (JP); Yoshitaka Shibata, Hirakata (JP)

(73) Assignee: KOMATSU LTD., Tokyo (JP)

(*) Notice: Subject to any disclaimer, the term of this patent is extended or adjusted under 35 U.S.C. 154(b) by 288 days.

(21) Appl. No.: 15/560,272

(22) PCT Filed: Apr. 15, 2015

(86) PCT No.: PCT/JP2015/061590
§ 371 (c)(1),
(2) Date: Sep. 21, 2017

(87) PCT Pub. No.: WO2016/166840
PCT Pub. Date: Oct. 20, 2016

(65) Prior Publication Data
US 2018/0071858 A1    Mar. 15, 2018

(51) Int. Cl.
*B23K 20/12* (2006.01)
*B23K 20/24* (2006.01)
(Continued)

(52) U.S. Cl.
CPC .......... *B23K 20/12* (2013.01); *B23K 20/1295* (2013.01); *B23K 20/227* (2013.01);
(Continued)

(58) Field of Classification Search
None
See application file for complete search history.

(56) References Cited

U.S. PATENT DOCUMENTS 3,571,906 A * 3/1971 Barth ............... B23K 20/12
228/113
3,853,258 A * 12/1974 Louw ............... B23K 20/12
228/2.3
(Continued)

FOREIGN PATENT DOCUMENTS

CN     1334168 A    2/2002
CN   101109292 A    1/2008
(Continued)

OTHER PUBLICATIONS

Jul. 14, 2015 International Search Report issued in International Patent Application No. PCT/JP2015/061590.

*Primary Examiner* — Devang R Patel
(74) *Attorney, Agent, or Firm* — Oliff PLC

(57) ABSTRACT

The method includes a step of preparing a first member made of a first metal and a second member made of a second metal having a smaller deformation resistance than the first metal, and a step of joining the first member and the second member. The step of joining includes a step of disposing the second member in a cavity of a mold, a step of heating the first member and the second member by relatively rotating the first member with respect to the second member, while pressing the first member against the second member, without changing a positional relationship, and a step of cooling the first member and the second member with the members being in contact with each other. In the step of disposing, the second member is disposed such that a second member contact surface is surrounded by the sidewall of the cavity.

4 Claims, 5 Drawing Sheets

(51) Int. Cl.
  *B23K 20/227*  (2006.01)
  *B23K 103/04*  (2006.01)
  *B23K 103/10*  (2006.01)
  *B23K 103/22*  (2006.01)
  *B23K 103/20*  (2006.01)

(52) U.S. Cl.
  CPC .......... *B23K 20/2275* (2013.01); *B23K 20/24* (2013.01); *B23K 2103/04* (2018.08); *B23K 2103/10* (2018.08); *B23K 2103/20* (2018.08); *B23K 2103/22* (2018.08)

(56) References Cited

U.S. PATENT DOCUMENTS

| | | | | |
|---|---|---|---|---|
| 3,857,163 A | * | 12/1974 | Hirschfield | B23K 20/02 228/164 |
| 4,582,242 A | * | 4/1986 | Spindler | B23K 20/129 228/113 |
| 5,897,047 A | * | 4/1999 | Takei | B23K 20/12 228/114 |
| 6,638,641 B2 | * | 10/2003 | Delano | B23K 20/129 228/112.1 |
| 2001/0040179 A1 | * | 11/2001 | Tochigi | B23K 20/126 228/2.1 |
| 2003/0031892 A1 | * | 2/2003 | Fujita | B32B 15/012 428/653 |
| 2003/0066864 A1 | * | 4/2003 | Delano | B23K 20/1295 228/112.1 |
| 2007/0272728 A1 | | 11/2007 | Dzialas et al. | |
| 2008/0277451 A1 | * | 11/2008 | Slattery | B23K 20/12 228/2.1 |
| 2016/0023301 A1 | * | 1/2016 | Reed | B23K 20/1205 228/112.1 |

FOREIGN PATENT DOCUMENTS

| | | |
|---|---|---|
| CN | 103846545 A | 6/2014 |
| DE | 3626009 A1 | 2/1987 |
| DE | 102012001779 A1 | 8/2013 |
| JP | S60-187486 A | 9/1985 |
| JP | H06-63775 A | 3/1994 |
| JP | H08-281453 A | 10/1996 |
| JP | H10-89241 A | 4/1998 |
| JP | 2000-301364 A | 10/2000 |
| JP | 2000301364 A * | 10/2000 |
| JP | 2000-343246 A | 12/2000 |
| JP | 2006-255749 A | 9/2006 |

* cited by examiner

METHOD FOR PRODUCING METAL MEMBER

TECHNICAL FIELD

The present invention relates to methods for producing metal members, and more specifically, to a method for producing a metal member having a structure in which members made of different metals are joined.

BACKGROUND ART

A metal member having a structure in which members made of different metals are fixed to each other may be adopted as a machine component. For example, as a piston shoe of a hydraulic pump or a hydraulic motor, one having a base section made of steel to which a sliding section made of copper alloy is fixed is known. As a piston shoe of this type, one in which the sliding section is fixed to the base section by caulking may be used.

In order for the sliding section to be fixed to the base section by caulking, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the piston shoe described in Patent Literature 1 above, the sliding section is fixed to the base section only by engagement. If the piston shoe receives an impact, the fixed state of the sliding section to the base section may become unstable.

An object of the present invention is to provide a method for producing a metal member having a structure in which members made of different metals are directly joined firmly to each other.

Solution to Problem

A method for producing a metal member according to the present invention includes the steps of: preparing a first member made of a first metal and a second member made of a second metal having a smaller deformation resistance than the first metal; disposing the second member in a cavity formed in a mold, the cavity being defined by a bottom wall and a sidewall extending from the bottom wall in a direction intersecting the bottom wall; heating the first member and the second member by relatively rotating the first member with respect to the second member about an axis of rotation, while relatively pressing the first member against the second member disposed in the cavity, without changing a positional relationship of the first member relative to the second member; and joining the first member and the second member by cooling the first member and the second member heated, with the members being in contact with each other. In the step of disposing the second member, the second member is disposed such that a second member contact surface as a surface of the second member coming into contact with the first member is surrounded by the sidewall defining the cavity.

In the metal member producing method of the present invention, with the first member being in contact with the second member disposed in the mold, the first member is relatively rotated about the axis of rotation without changing its positional relationship relative to the second member, so that the first member and the second member are heated. At this time, as the deformation resistance of the second member is smaller than that of the first member, the second member is deformed and comes into contact with the sidewall defining the cavity of the mold. This restricts rotation of the second member together with the first member, and also restricts further deformation of the second member. The friction between the first member and the second member generates further heat, and the generated heat is prevented from being released from within the cavity. The first member and the second member thus heated are cooled, while being maintained in the state of contacting each other, whereby the first member and the second member are joined directly.

As such, according to the metal member producing method of the present invention, it is possible to produce the metal member having a structure in which members made of different metals are directly joined firmly to each other.

The metal member producing method described above may further include the step of removing a flash formed due to deformation of the second member in the step of heating the first member and the second member. With this configuration, it is possible to obtain the metal member having removed therefrom the flash formed while joining the first member and the second member.

In the metal member producing method described above, in the step of heating the first member and the second member, the second metal in a temperature increased state may have a deformation resistance smaller by 10% or more as compared to a deformation resistance of the first metal in a temperature increased state. This facilitates joining of the first member with the second member.

Effects of the Invention

As is clear from the above description, according to the metal member producing method in the present invention, it is possible to produce the metal member having a structure in which members made of different metals are directly joined firmly to each other.

DESCRIPTION OF EMBODIMENT

Figure 1:
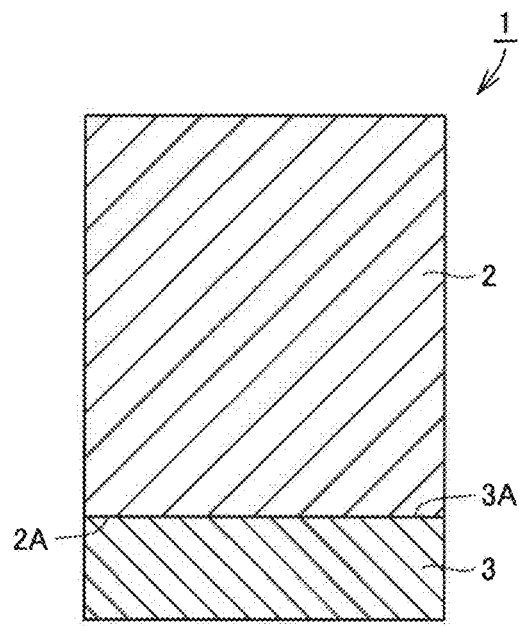
FIG. 1 is a schematic cross-sectional view showing the structure of a metal member.

An embodiment of the present invention will now be described. In the following drawings, the same or corresponding parts are denoted by the same reference numerals, and the description thereof will not be repeated.

FIG. 1 is a schematic cross-sectional view showing the structure of a metal member (machine component) that can be produced by the method for producing a metal member according to the present embodiment. Referring to FIG. 1, the metal member 1 has a structure in which a first member 2 made of a first metal and a second member 3 made of a second metal are joined together.

The first member 2 has a cylindrical shape. One end face 2A of the first member 2 serves as a joint surface with the second member 3. The second member 3 has a disk shape. One end face 3A of the second member 3 serves as a joint surface with the first member 2. The second metal constituting the second member 3 has a deformation resistance smaller than that of the first metal constituting the first member 2. This metal member 1 can be produced by the method for producing a metal member in the present embodiment as follows.

Figure 2:
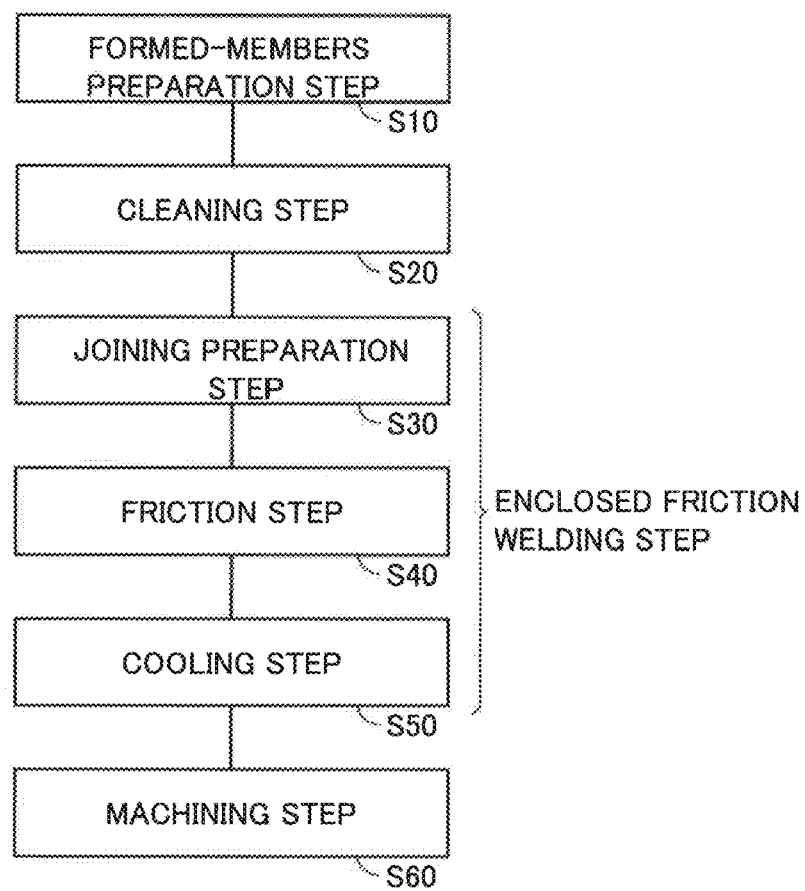
FIG. 2 is a flowchart schematically illustrating a method for producing a metal member.
Figure 3:
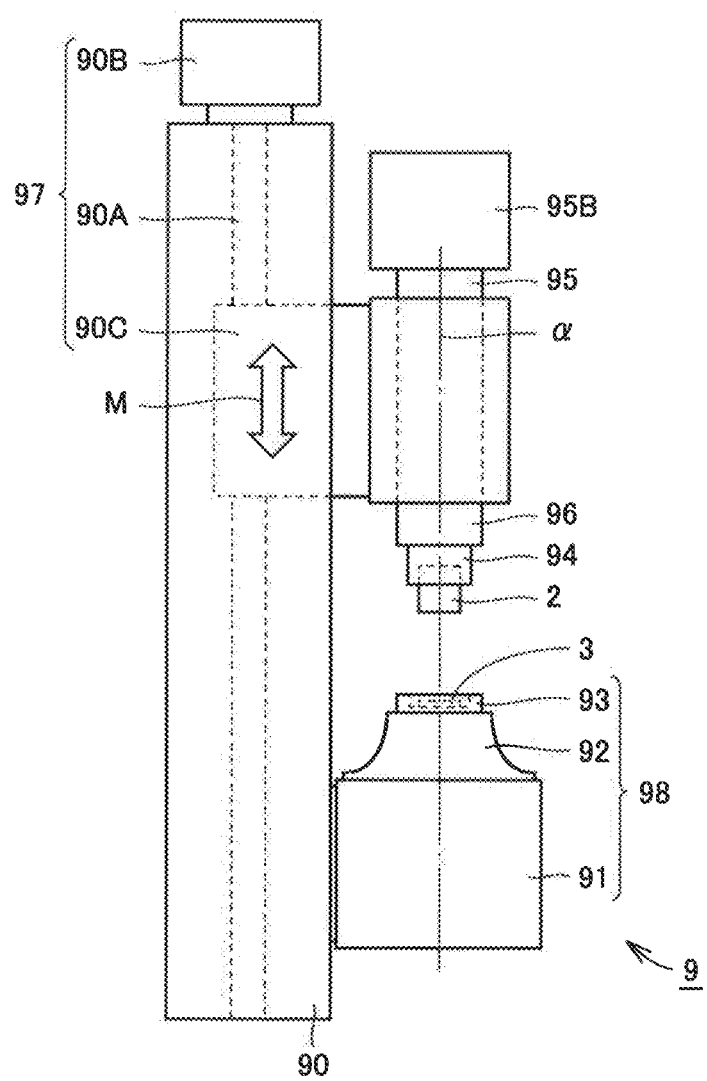
FIG. 3 is a schematic diagram showing the structure of a device for producing a metal member.
Figure 4:
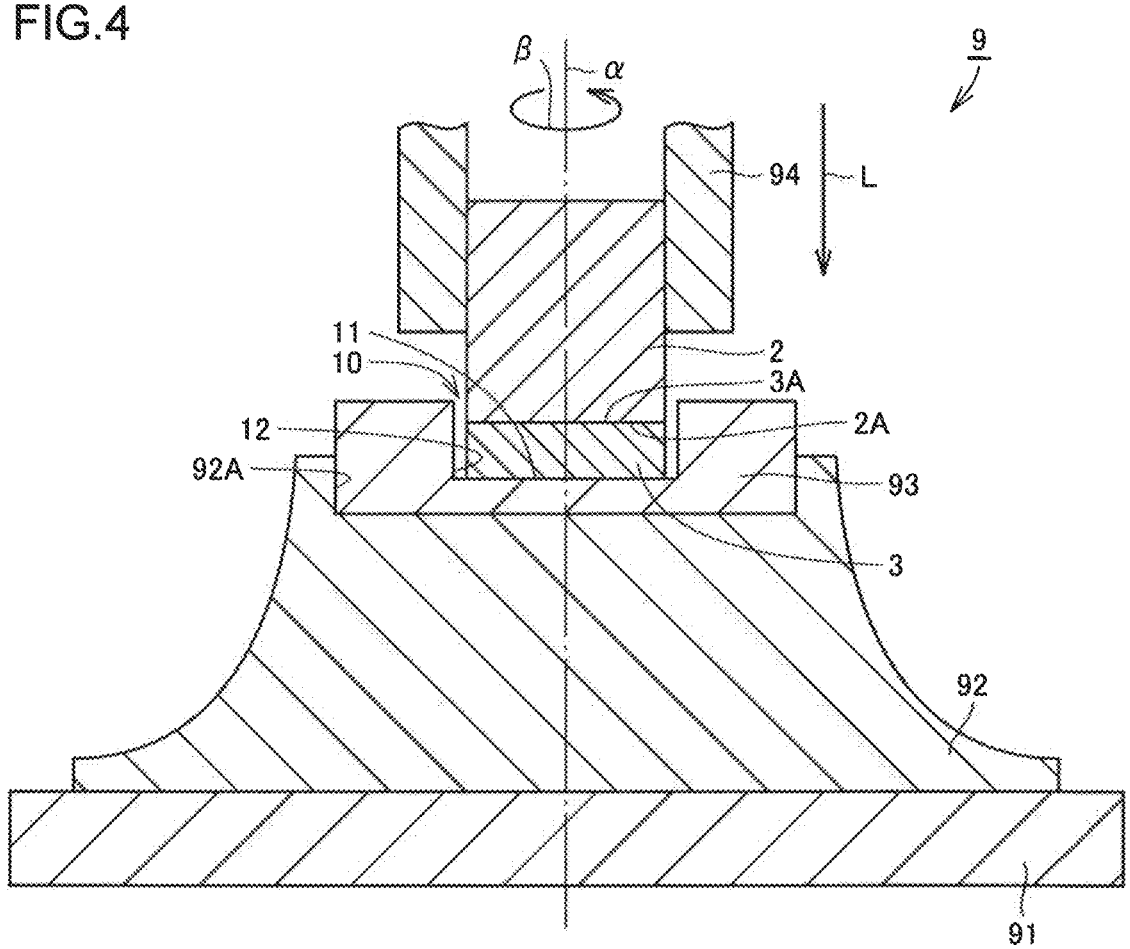
FIG. 4 is a schematic cross-sectional view showing the operation of the metal member producing device.
Figure 5:
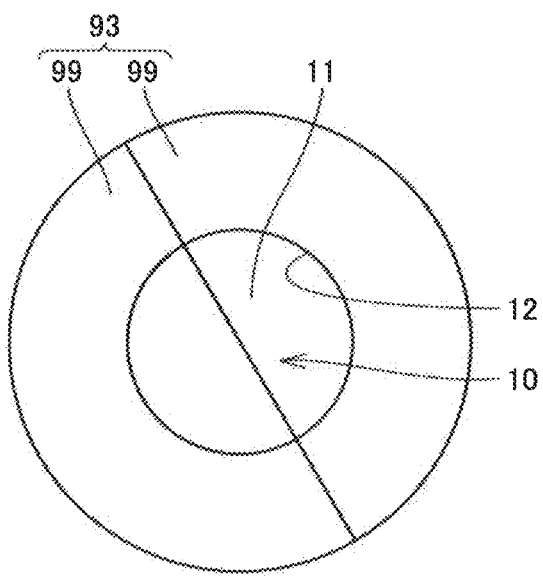
FIG. 5 is a schematic plan view showing the structure of a mold.

FIG. 2 is a flowchart schematically illustrating the method for producing a metal member. FIG. 3 is a schematic diagram showing the structure of a device for producing a metal member. FIG. 4 is a schematic cross-sectional view showing the operation of the metal member producing device. FIG. 5 is a schematic plan view showing the structure of a mold included in the metal member producing device.

Referring to FIG. 2, in the method for producing the metal member 1 in the present embodiment, first, a formed-members preparation step is carried out as a step S10. In this step S10, referring to FIG. 1, a cylindrical first member 2, made of thermally refined alloy steel for machine structural use, and a disk-shaped second member 3, made of high-strength brass, for example, are prepared. One end face 2A of the first member 2 serves as a first member contact surface, which is a flat surface to be joined to the second member 3. One end face 3A of the second member 3 serves as a second member contact surface, which is a flat surface to be joined to the first member 2.

Next, a cleaning step is carried out as a step S20. In this step S20, the first member 2 and the second member 3 prepared in the step S10 are cleaned. The first member 2 and the second member 3 are cleaned using methanol, ethanol, acetone, or other liquid. This removes any foreign matters attached to the first member 2 or the second member 3 during the cutting, machining, or other processes for preparing the first member 2 and the second member 3. In the method for producing the metal member 1 in the present embodiment, precision finish work on the one end face 3A of the second member 3 may be omitted; the one end face 3A of the second member 3 may be left as cut.

Next, referring to FIG. 2, an enclosed friction welding step is carried out. This enclosed friction welding step includes a joining preparation step, a friction step, and a cooling step. Here, a device for producing a metal member which produces the metal member 1 by conducting enclosed friction welding will be described.

Referring to FIG. 3, an enclosed friction welding device 9 which is the device for producing a metal member includes: a spindle 95 which is rotatable about an axis a, a base portion 98 disposed spaced apart from the spindle 95 in the axis a direction, a driving portion 97 which adjusts the spacing between the spindle 95 and the base portion 98 by driving the spindle 95 in the axis a directions, and a frame 90 which supports the spindle 95 and the base portion 98.

Referring to FIG. 3, inside the frame 90, a shaft 90A is disposed to extend in parallel with the axis a. This shaft 90A supports a spindle support portion 90C which supports the spindle 95, so as to allow the spindle support portion 90C to move in the directions in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis a directions. This enables adjustment of the spacing between the spindle 95 and the base portion 98. The shaft 90A, the spindle support portion 90C, and the spindle moving motor 90B constitute the driving portion 97.

A chuck 94 and a mold 93 are arranged so that, in a state (shown in FIG. 4) where the first member 2 and the second member 3 are made to contact each other with the spacing between the spindle 95 and the base portion 98 adjusted by the driving portion 97, a sidewall 12 defining a cavity 10 surrounds the outer periphery of the one end face 3A, which is the surface of the second member 3 coming into contact with the first member 2. Referring to FIG. 4, the sidewall 12 has a height in the axis a direction that is greater than the thickness of the second member 3.

Referring to FIG. 3, the spindle 95 includes the chuck 94, which is a first holding portion for holding the first member 2 to oppose the base portion 98. The spindle 95 has connected thereto a spindle motor 95B which rotatively drives the spindle 95 about the axis a. The spindle 95 further has mounted thereon a load sensor 96 which detects a contact load between the first member 2 and the second member 3. The load sensor 96 detects the contact load between the first member 2 and the second member 3 from the magnitude of the contact reaction force between the first member 2 and the second member 3 that is applied to the chuck 94. Although the load sensor 96 is not an indispensable component for the enclosed friction welding device 9, the sensor, when provided, facilitates adjusting the contact load between the first member 2 and the second member 3 to an appropriate range.

The base portion 98 has the mold 93 disposed thereon, which is a second holding portion for holding the second member 3 to oppose the chuck 94. Referring to FIGS. 3 and 4, the base portion 98 includes a base body 91, a mold holder 92, and the mold 93. The base body 91 is disposed on the frame 90. The mold holder 92 is fixed on the base body 91. The mold 93 is fitted and secured in a mold holding portion 92A, which is a recessed portion formed in the mold holder 92. The mold 93 can be separated into two parts 99, 99, as shown in FIG. 5.

Referring to FIGS. 4 and 5, the mold 93 includes: a bottom wall 11 which is a circular, planar surface, and a sidewall 12 which extends from the bottom wall 11 in a direction intersecting (direction perpendicular to) the bottom wall 11. The bottom wall 11 and the sidewall 12 define the cavity 10. The sidewall 12, which is connected to the outer periphery of the bottom wall 11 of the circular shape, has a cylindrical surface shape having the same diameter as the bottom wall 11.

A specific procedure of the enclosed friction welding step will now be described. Referring to FIGS. 3 and 4, in the joining preparation step carried out as a step S30, the first member 2 is held at the outer peripheral surface by the chuck 94, and the second member 3 is set in the cavity 10 of the mold 93. At this time, the first member 2 and the second member 3 are arranged so that the one end face 2A of the first member 2 and the one end face 3A of the second member 3 oppose each other, and that the central axes of the first member 2 and the second member 3 agree with the rotational axis a of the chuck 94.

A release agent is introduced into the cavity 10. Thus, in a step S40 described below, the first member 2 and the second member 3 are heated in the presence of the release agent in the cavity 10. Although introduction of the release agent is not an indispensable procedure, the release agent, when introduced, facilitates removal of a structural body, formed with the first member 2 and the second member 3 joined together, from the mold 93 in a step S50 described later. The release agent may be liquid or powder.

Next, the friction step is carried out as a step S40. In this step S40, the spindle 95 is driven by the spindle motor 95B to rotate about the axis a, and it is also driven by the spindle moving motor 90B to approach the base portion 98. Consequently, the chuck 94 approaches the mold 93 while rotating about the axis a.

The first member 2 relatively rotates, while being pressed against the second member 3 with a prescribed load, without changing its position relative to the second member 3. This increases the temperatures at the contact portions (joint portions) of the first member 2 and the second member 3 because of the frictional heat. The temperature of the second member 3 increases, for example, to a temperature that is not lower than the softening point and lower than the melting point of the second metal constituting the second member 3.

The second member 3 has a deformation resistance smaller than that of the first member 2, as explained above. The heated second member 3 softens and deforms, thereby contacting the sidewall 12 of the mold 93. This restricts rotation of the second member 3 together with the first member 2, and also restricts further deformation of the second member 3. The friction between the first member 2 and the second member 3 generates further heat, and the generated heat is prevented from being released from within the cavity 10.

Next, the cooling step is carried out as a step S50. In this step S50, first, the rotational speed of the spindle 95 is lowered, and the rotation is stopped. Thereafter, the pressing load detected by the load sensor 96 is decreased. During this time, the contact portions of the first member 2 and the second member 3 are cooled, with the first member 2 and the second member 3 maintaining the state of being pressed against each other. Accordingly, the first member 2 and the second member 3 are joined. Then, the pressing load is set to zero, and the metal member 1, which is the structural body formed with the first member 2 and the second member 3 joined together, is taken out from the enclosed friction welding device 9. Through the above procedure, the enclosed friction welding step is completed.

Next, a machining step is carried out as a step S60. In this step S60, the metal member 1 obtained in the step S50 is subjected to machining. In the step S60, for example, the flash formed due to deformation of the second member 3 in the step S40 is removed. Thereafter, heat treatment, finishing work, and so on are performed as appropriate, whereby the metal member 1 is completed.

As described above, according to the method for producing the metal member 1 using the enclosed friction welding device 9 in the present embodiment, it is possible to produce the metal member 1 having a structure in which the first member 2 made of the first metal and the second member 3 made of the second metal having a smaller deformation resistance than the first metal are directly joined firmly to each other. The metal member 1 having the structure in which members made of different metals are directly joined firmly to each other is produced.

In the step S40, the deformation resistance of the second member 3 (second metal) in the temperature increased state is preferably smaller by 10% or more, as compared to the deformation resistance of the first member 2 (first metal) in the temperature increased state. As explained above, the first member 2 and the second member 3 can be joined as in the present embodiment when the second member 3 (second metal) is smaller in deformation resistance than the first member 2 (first metal). If the difference in deformation resistance between the first member 2 and the second member 3 is small, however, not only the second member 3, but also the first member 2 may be deformed and come into contact with the sidewall 12 of the mold 93 in the step S40.

In such a case, it would be difficult to join the first member 2 and the second member 3 satisfactorily, thereby creating a need to strictly manage the temperatures of the first member 2 and the second member 3 in the step S40. Setting the deformation resistance of the second metal in the temperature increased state smaller than that of the first metal by 10% or more facilitates achievement of good joining. Setting the deformation resistance of the second metal in the temperature increased state smaller than that of the first metal by 50% or more, or even 80% or more, can further facilitate the achievement of good joining.

Examples

An experiment was conducted in which a first member 2 and a second member 3 were joined through a similar procedure as in the above embodiment to produce a sample of the metal member 1. For the metal (first metal) constituting the first member 2, steel (alloy steel for machine structural use) was adopted. For the metal (second metal) constituting the second member, high-strength brass (Example A) and 6000 series aluminum alloy (Al—Mg—Si based alloy) (Example B) were adopted. Further, for comparison, it was attempted to produce a sample of a metal member through a similar procedure by adopting high-strength brass as the metal constituting the first member 2 and steel as the metal constituting the second member 3. The combinations of the metals used in the experiment are shown in Table 1 below. The photographs of the obtained samples are shown in FIGS. 6 to 12.

TABLE 1

|  | First Member | Second Member |
| --- | --- | --- |
| Example A | steel | high-strength brass |
| Example B | steel | aluminum alloy |
| Comparative Example A | high-strength brass | steel |

Referring to Table 1, in the combinations of the metals in Examples A and B, the deformation resistance of the second member 3 is smaller than that of the first member 2. In the combination of the metals in Comparative Example A, the deformation resistance of the second member 3 is larger than that of the first member 2.

Figure 6:
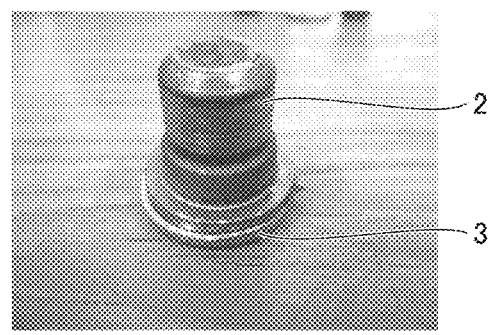
FIG. 6 is a photograph showing an example of a metal member having a first member made of steel and a second member made of brass joined together.
Figure 7:
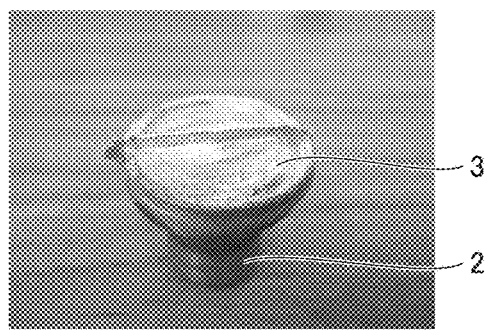
FIG. 7 is another photograph showing the example of the metal member having the first member made of steel and the second member made of brass joined together.

FIGS. 6 and 7 are photographs of the sample obtained by the combination of the metals in Example A. Referring to FIGS. 6 and 7, with the combination of Example A, a metal member having the first member 2 and the second member 3 joined favorably has been produced.

Figure 8:
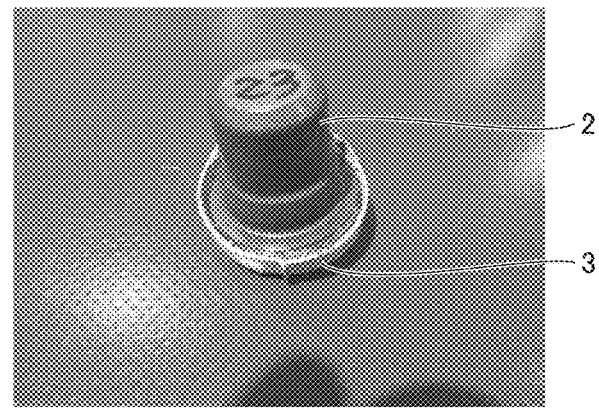
FIG. 8 is a photograph showing an example of a metal member having a first member made of steel and a second member made of aluminum alloy joined together.
Figure 9:
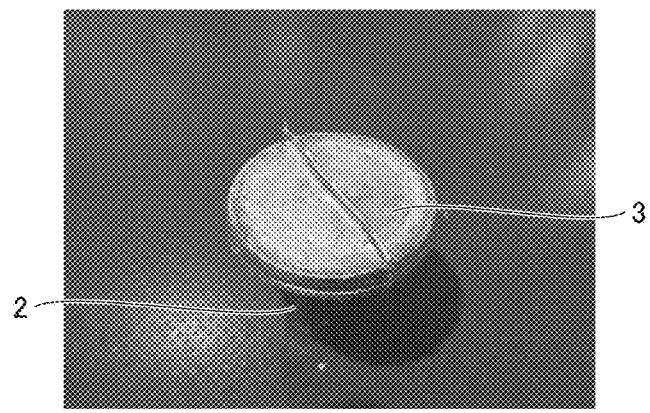
FIG. 9 is another photograph showing the example of the metal member having the first member made of steel and the second member made of aluminum alloy joined together.

FIGS. 8 and 9 are photographs of the sample obtained by the combination of the metals in Example B. Referring to FIGS. 8 and 9, with the combination of Example B as well, a metal member having the first member 2 and the second member 3 joined favorably has been produced.

Figure 10:
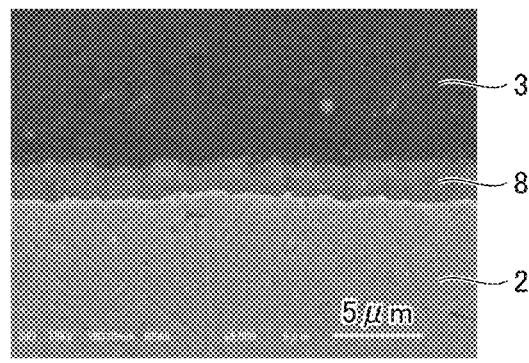
FIG. 10 is a scanning electron microscope (SEM) photograph showing the state at and around the interface between the first member made of steel and the second member made of aluminum alloy.

FIG. 10 is an SEM photograph of the metal member obtained in Example B, showing the state at and around the interface between the first member 2 and the second member 3. Referring to FIG. 10, it is recognized that a reaction layer 8 has been formed at the interface between the first member 2 and the second member 3. As a result of analysis, the reaction layer 8 was found to be an intermetallic compound of iron and aluminum. With such a reaction layer 8 formed, the first member 2 and the second member 3 are directly joined firmly to each other.

Figure 11:
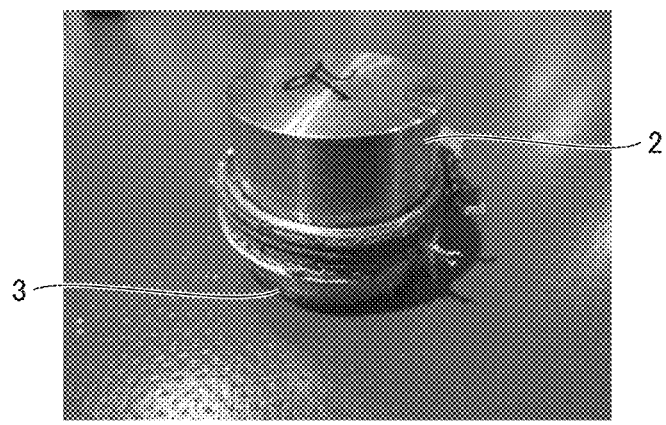
FIG. 11 is a photograph showing the state of a sample obtained when attempting to join a first member made of brass and a second member made of steel.
Figure 12:
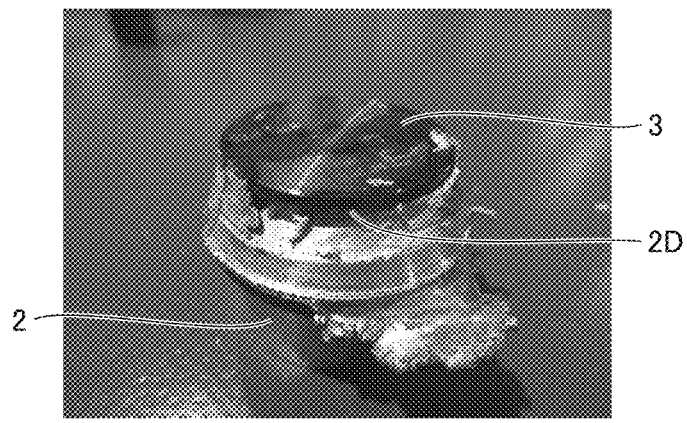
FIG. 12 is another photograph showing the state of the sample obtained when attempting to join the first member made of brass and the second member made of steel.

FIGS. 11 and 12 are photographs of the sample obtained by the combination of the metals in Comparative Example A. Referring to FIGS. 11 and 12, the combination of Comparative Example A failed to achieve good joining between the first member 2 and the second member 3.

This is presumably because the first member 2 made of high-strength brass was deformed considerably in the step S40 as the friction step, and the first member 2 rotated while contacting the sidewall 12 of the mold 93. The flash formed due to deformation of the first member 2 is conspicuous. Further, a region of the first member 2 that was supposed to be joined to the second member 3 has been hollowed out to a large extent, leaving a gouge 2D.

The above experimental results show that the metal member producing method according to the present invention is able to produce the metal member having a structure in which members made of different metals are directly joined firmly to each other.

While the case of adopting steel as the metal (first metal) constituting the first member and brass or aluminum alloy as the metal (second metal) constituting the second member has been given by way of example in the embodiment and examples described above, the metals adoptable in the present invention are not limited thereto. Examples of combination of adoptable metals are shown in Table 2 below.

TABLE 2

| First Member | Second Member |
| --- | --- |
| steel | brass |
| steel | aluminum alloy |
| steel | nickel-based alloy |
| cemented carbide | steel |

As shown in Table 2, in the metal member producing method of the present invention, various combinations of the first member made of a first metal and the second member made of a second metal having a smaller deformation resistance than the first metal can be adopted.

It should be understood that the embodiment and examples disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The metal member producing method according to the present invention may be applicable particularly advantageously to the production of a metal member having a structure in which members made of different metals are directly joined to each other.

DESCRIPTION OF REFERENCE NUMERALS

1: metal member; 2: first member; 2A: end face; 2D: gouge; 3: second member; 3A: end face; 8: reaction layer; 9: enclosed friction welding device; 10: cavity; 11: bottom wall; 12: sidewall; 90: frame; 90A: shaft; 90B: spindle moving motor; 90C: spindle support portion; 91: base body; 92: mold holder; 92A: mold holding portion; 93: mold; 94: chuck; 95: spindle; 95B: spindle motor; 96: load sensor; 97: driving portion; 98: base portion; and 99: part.

The invention claimed is:

1. A method for producing a metal member, comprising the steps of:
preparing a first member made of a first metal and a second member made of a second metal having a smaller deformation resistance than the first metal; and
joining the first member and the second member;
the step of joining the first member and the second member including steps of
disposing the second member in a cavity formed in a mold, the cavity being defined by a bottom wall and a sidewall extending from the bottom wall in a direction intersecting the bottom wall, wherein an entire outer peripheral surface of the second member in an axial direction is spaced from the sidewall of the cavity so that the mold does not restrain the second member in a radial direction,
heating the first member and the second member by relatively rotating the first member with respect to the second member about an axis of rotation, while relatively pressing the first member against the second member disposed in the cavity, and
cooling the first member and the second member heated, with the members being in contact with each other,
the step of disposing the second member including disposing the second member such that a surface of the second member that contacts the first member and is adjacent to the first member is at a height that is less than a height of the sidewall of the cavity.

2. The method for producing a metal member according to claim 1, further comprising the step of removing a flash formed due to deformation of the second member in the step of heating the first member and the second member.

3. The method for producing a metal member according to claim 1, wherein in the step of heating the first member and the second member, the second metal in a temperature increased state has a deformation resistance smaller by 10% or more as compared to a deformation resistance of the first metal in a temperature increased state.

4. The method for producing a metal member according to claim 1, wherein the bottom wall of the cavity is flat.

* * * * *